United States Patent Office
2,972,637
Patented Feb. 21, 1961

2,972,637
PREPARATION OF BROMOFLUOROMETHANES

Charles William Tullock, Wilmington, Del., assignor to E. I. du Pont de Nemours and Company, Wilmington, Del., a corporation of Delaware No Drawing. Filed June 19, 1958, Ser. No. 743,010

13 Claims. (Cl. 260—653)

This invention relates to a novel method for preparing bromofluoromethanes.

Bromofluoromethanes form a group of industrially valuable products which are employed as extraction agents, refrigerants, solvents and as components of fire extinguishers. They are especially suitable for use in confined areas because of the low toxicity of their decomposition products.

The bromofluoromethanes have generally been prepared by processes which employ directly or indirectly elemental fluorine or hydrogen fluoride. Such processes require particular care in operation because of the known toxic and corrosive characteristics of the fluorinating agents. Other processes employ as reactants fluorinated compounds that are not readily available and are costly to prepare. Accordingly, one object of this invention is the synthesis of bromofluoromethanes by a direct route from low cost readily available materials. Other objects will become apparent from the following disclosure.

The present invention provides a simple and economical process for the manufacture of bromofluoromethanes. The process consists in reacting at a temperature of at least 125° C. carbon disulfide and bromine with a binary fluoride of an element of atomic number 11–30, inclusive, fluoride of an element selected from the group consisting of sodium, potassium, calcium, copper, zinc, and sulfur, which fluoride contains at most four fluorine atoms.

The process of the invention is a reaction employing three components, that is, an inorganic fluoride, carbon disulfide and bromine. Other materials may be present, for example, inert gases or catalytic quantities of selected fluorides, but they are not essential for operability. The only essential components, as stated previously, are the inorganic fluoride, carbon disulfide and bromine. The principal products of the reaction of these three components are dibromodifluoromethane and bromotrifluoromethane. The by-products of the reaction are primarily inorganic bromides, including sulfur bromides, and free sulfur. A substantial proportion of the fluorine, originally present in the inorganic fluoride, is found in the desired end products, that is, the bromofluoromethanes.

More specifically, the inorganic fluoride, carbon disulfide and bromine are preferably reacted under substantially anhydrous conditions in the substantial absence of oxygen at a temperature of at least 125° C. In a batch process the reaction proceeds satisfactorily at temperatures up to 700° C. Excessively high temperatures are not needed and offer no advantages. For good yields of the desired bromofluoromethanes, a preferred temperature range for batch operation is from about 150° C. to about 500° C.

The pressure employed in a batch process is generally autogenous. It will usually be between about 5 and 200 atmospheres but pressures outside this range are operable.

A continuous flow process is generally conducted at atmospheric pressure or at a pressure only moderately higher than atmospheric. Subatmospheric pressures can be employed. In general, a continuous flow process is conducted at a somewhat higher temperature (up to a 1000° C. or higher) than a batch process in order to obtain rapid reaction between the components.

The reactants employed in the process are, in general, well known and relatively low cost commercially available chemicals. Examples of inorganic fluorides which are operable in the process are the fluorides of sodium, potassium, calcium, copper, zinc, and sulfur. Sodium, potassium and calcium fluorides form a preferred group of fluorides because of low cost and availability. The fluorides of sodium and potassium are especially preferred since their use leads to good yields of the desired bromofluoromethanes. Mixtures of fluorides can be employed, for example, mixtures of sodium and potassium fluorides or calcium fluoride and sulfur tetrafluoride are operable. It is not essential that fluorides of high purity be employed; commercial grades are satisfactory. It is desirable that they be dried prior to use by conventional and well-known methods. Carbon disulfide and bromine of commercial grade can also be used in the process without special purification.

The molar ratios in which the reactants are used are not critical for operability of the process. However, for maximum yields of bromofluoromethanes, it is desirable that the inorganic fluoride be used in excess. Generally, in order to obtain good yields of desired products, the molar ratio, fluoride/carbon disulfide, will be between about 0.5 and 40. The preferred value of this ratio will be between about 1 and 10. The molar ratio, bromine/carbon disulfide, will generally be between about 0.1 and 20. The preferred value of this ratio is between about 0.5 and 10. As stated earlier the reaction can be conducted by either a batch or continuous flow process. In either method, the reaction is preferably conducted under substantially anhydrous conditions in a reaction chamber which is resistant to chemical attack by bromine and hydrogen fluoride. The reaction vessel is generally lined with a corrosion-resistant material such as stainless steel. In a continuous process the reactants are passed into a heated reaction zone if all are volatile or, if a solid inorganic fluoride is used, the volatile carbon disulfide and bromine are passed over the inorganic fluoride in a heated zone. In a batch process the reactants are heated in a closed vessel in the desired molar ratio.

The time required for the reaction will be determined to a large extent by the type of process employed, that is, whether continuous or batch, and by the temperature of the operation. In a continuous flow process, the time of reaction is short, on the order of a second or less, and unreacted components can be, and usually are, recirculated to obtain maximum conversion to the desired products. In a batch process, the reactants are maintained in contact with each other for a sufficient period to effect maximum conversion to the desired products, a period which will generally lie between about 2 hours and about 24 hours.

The reaction is preferably conducted in the substantial absence of air or oxygen. The reaction vessel is, therefore, generally flushed with an inert gas to remove air and traces of moisture which may be present. Examples of inert gases which can be used are nitrogen, argon or helium. In a batch process the reaction vessel, after having been charged, is closed and heated, preferably with agitation by any suitable means, under autogenous pressure. Agitation can be accomplished mechanically by shaking the entire reaction vessel or by a motor-driven stirrer.

Heating can be accomplished by conventional and well known methods. The reactants can be heated slowly by a stepwise procedure wherein the reactants are maintained for short periods of time at progressively higher temperatures. This procedure permits smooth operation of the process and avoids sudden increases in pressure in the reaction vessel. However, this procedure is not essential for operability and the reactants can, if desired, be heated in one step to the desired reaction temperature.

The process of the invention can also be conducted in the presence of a catalyst; for example, iodine or arsenic trifluoride. The catalysts are employed primarily with sulfur tetrafluoride and their use can lead to increased yields of desired products at somewhat lower temperatures of operation than are required otherwise. However, the presence of a catalyst is not essential for operability and its use is determined primarily by economic factors.

The products of the reaction are collected and purified by conventional procedures. They can, for example, be collected in corrosion-resistant vessels which are cooled to a low temperature with liquid nitrogen or liquid helium. The products can be purified by known methods such as distillation through a low temperature fractionation unit.

The principal products of the reaction are bromotrifluoromethane, boiling at about −60° C. and dibromodifluoromethane, boiling at about 24.5° C. Other products which are obtained in small quantities are carbon tetrafluoride and trifluoromethyl sulfides of the formula $CF_3S_nCF_3$, where $n$ is 1, 2 or 3.

The by-products of the reaction, that is, elemental sulfur, inorganic bromides and sulfur-bearing compounds, are relatively high boiling or non-volatile and are, therefore, readily separated from the bromofluoromethanes. If oxygen or air is present during the reaction, small amounts of carbon oxysulfide and other oxygen-bearing compounds are formed.

The following examples in which quantities are expressed as parts by weight, illustrate the process of the invention. In each of the examples a vessel is used which is lined with "Hastelloy" C and is capable of withstanding pressure. "Hastelloy" C is a well-known chemically-resistant alloy of nickel, iron and molybdenum. Yields given in the examples are based on the carbon available in the reaction from the carbon disulfide.

Examples I and II illustrate the operation of the process of the invention in which the fluorides of the elements of group I-A, that is, sodium and potassium, are employed.

Example I

A. A reaction vessel (capacity, 1000 parts of water) is flushed with nitrogen and is charged with 19 parts of carbon disulfide, 120 parts of bromine and 63 parts of sodium fluoride. The molar ratio of the reactants, carbon disulfide/bromine/sodium fluoride, is about 1/3/6. The vessel is closed, cooled with solid carbon dioxide and evacuated to 1–2 mm. pressure. It is then heated with agitation for 2 hours at 200° C. and 6 hours at 250° C. The vessel is cooled to about 25° C., and volatile products of the reaction are vented into a stainless steel cylinder cooled in liquid nitrogen. There is obtained 38 parts of a volatile product which is distilled through an effective fractionating column to obtain 5 parts of liquid boiling at 20 to 46° C. The liquid is stored over potassium iodide to remove any free bromine which might be present. There remains 3 parts of colorless liquid which is shown by mass spectrometric analysis to contain, on a molar basis, 7.5–8.5% of dibromodifluoromethane and a smaller quantity of bromotrifluoromethane. Under the conditions of the reaction, about 1% of the carbon disulfide is converted to bromofluoromethanes, principally $CF_2Br_2$.

B. Using the procedure described in part A, a mixture of 19 parts of carbon disulfide, 160 parts of bromine and 100 parts of sodium fluoride is heated for 2 hours at 200° C. and 2 hours at 250° C. The molar ratio of reactants, carbon disulfide/bromine/sodium fluoride, is about 1/4/10. There is obtained 9 parts of a volatile product which is shown by infrared analysis to contain, on a molar basis, 20–25% of dibromodifluoromethane. This amounts to a yield of about 6% based on the carbon disulfide. A small quantity of trifluoromethyl sulfides is also obtained.

C. Using the procedure as described in part A above, except that a reaction vessel of half the capacity is employed, a mixture of 19 parts of carbon disulfide, 80 parts of bromine and 40 parts of sodium fluoride is heated for 1 hour at 200° C., 1 hour at 300° C. and 1 hour at 350° C. There is obtained 48 parts of a volatile product which is distilled to yield 6 parts of material boiling below 0° C. and 9 parts boiling at 15 to 53° C. The fraction boiling below 0° C. contains, on a molar basis as determined by infrared spectroscopy, 75% of bromotrifluoromethane. The fraction boiling at 15 to 53° C. contains on the same basis 5–10% dibromodifluoromethane. About 14% of the carbon disulfide is converted to bromotrifluoromethane and about 1% to dibromodifluoromethane.

D. Using the procedure as described in part A above, except that a reaction vessel of half the capacity is employed, a mixture of 13 parts of carbon disulfide, 107 parts of bromine and 70 parts of sodium fluoride is heated at 200° C. for 1 hour, 300° C. for 1 hour and 350° C. for 1 hour. The molar ratio of reactants, carbon disulfide/bromine/sodium fluoride is about 1/4/10. There is obtained 45 parts of a volatile product which is fractionally distilled to yield 8 parts of product boiling below −30° C. and 6 parts of product boiling at 14.5 to 46° C. Infrared analysis of the fraction boiling at less than −30° C. shows that it contains, on a molar basis, 80–85% of bromotrifluoromethane and a small amount of dibromodifluoromethane. The fraction boiling at 14.5 to 46° C. is stored in a closed container over potassium iodide to remove free bromine. There is obtained 5 parts of liquid which is shown by infrared spectroscopy to contain, on a molar basis, 25–30% of dibromodifluoromethane. Under the conditions of the reaction about 28% of the carbon disulfide is converted to bromotrifluoromethane and 11% to dibromodifluoromethane.

Example I shows that improved yields of the desired bromofluoromethanes are obtained when the inorganic fluoride is employed in excess and the temperature of the reaction is above 300° C.

Example II

A reaction vessel (capacity, 500 parts of water) is charged as described in Example I with a mixture of 19 parts of carbon disulfide, 80 parts of bromine, and 59 parts of potassium fluoride. The molar ratio of reactants, carbon disulfide/bromine/potassium fluoride, is 1/2/4. The vessel and contents are heated at 200° C. for 1 hour, 300° C. for 1 hour and 350° C. for 1 hour. There is obtained 61 parts of a volatile product which is distilled to yield 2 parts of product boiling from below −40° C. to 30° C. This product contains, on a molar basis as determined by infrared spectroscopy, 65% of bromotrifluoromethane and 5–10% of dibromodifluoromethane. About 4% of the carbon disulfide is converted to bromotrifluoromethane and 0.5% to dibromodifluoromethane. Improved yields are obtained by employing potassium fluoride which has been finely divided by suitable mechanical methods.

Example III illustrates the use of copper fluoride in the process of the invention.

Example III

A pressure vessel (capacity, 500 parts of water) is charged as described in Example I with 19 parts of carbon disulfide, 80 parts of bromine, and 50 parts of copper fluoride. The molar ratio of reactants, carbon disulfide/ bromine/copper fluoride, is 1/2/2. The vessel and contents are heated at 200° C. for 1 hour, 300° C. for 2 hours and 325° C. for 2 hours. There is obtained 34 parts of a volatile product which is distilled to yield 23 parts of product boiling at −53° C. to −44.5° C. which is shown by infrared spectroscopy to contain, on a molar basis, 95% of bromotrifluoromethane. About 59% of the carbon disulfide is converted to the bromofluoromethane.

Example IV illustrates the process of the invention in which a fluoride of an element of group II-A is employed.

Example IV

A pressure vessel (capacity, 200 parts of water) is charged as described in Example I with 12 parts of carbon disulfide, 95 parts of bromine and 40 parts of calcium fluoride. The vessel and contents are heated at 450° C. for 2 hours. There is obtained 20 parts of a volatile product which is shown by infrared spectroscopy to contain small quantities of bromotrifluoromethane and dibromodifluoromethane.

Example V illustrates the use of a fluoride of an element of group II-B in the novel process.

Example V

A mixture of 19 parts of carbon disulfide, 80 parts of bromine, and 70 parts of zinc fluoride is charged into a pressure vessel (capacity, 500 parts of water) as described in Example I and is heated at 200° C. for 1 hour, 300° C. for 2 hours and 325° C. for 2 hours. There is obtained 32 parts of a volatile product which is distilled to yield 11 parts of product, boiling at −51.5° to 35° C. The major portion of the product boils at −51.5° to −41.5° C. Analysis by infrared spectroscopy shows that the product contains, on a molar basis, 60% of bromotrifluoromethane with a very small amount of dibromodifluoromethane. There is obtained a 22% of conversion of carbon disulfide to bromotrifluoromethane.

Examples VI through IX illustrate the use of sulfur tetrafluoride in the process and the influence of mole ratios of reactants and catalysts on yields of bromofluoromethanes obtained.

Example VI

A mixture of 19 parts of carbon disulfide, 75 parts of bromine, and 20 parts of sulfur tetrafluoride is charged into a pressure vessel as described in Example I-C and is heated at 200° C. for 1 hour, 300° C. for 1 hour, and 325° C. for 1 hour. The molar ratio of reactants, carbon disulfide/bromine/sulfur tetrafluoride, is about 8/15/6. There is obtained 37 parts of a volatile product which is distilled through a low temperature fractionation unit to give 23 parts of material boiling at −53 to −35° C. This product is shown by infrared analysis to be substantially pure bromotrifluoromethane (yield, 62%).

Example VII

This example illustrates the improvement in yield of bromotrifluoromethane which is obtained when excess sulfur tetrafluoride is employed in the process.

A mixture of 19 parts of carbon disulfide, 67.5 parts of bromine, and 40 parts of sulfur tetrafluoride is heated at 200° C. for 1 hour, 300° C. for 1 hour, and 325° C. for 1 hour. The molar ratio of reactants, carbon disulfide/bromine/sulfur tetrafluoride, is about 8/14/12. In this reaction, the amount of sulfur tetrafluoride used is twice the amount employed in Example VI. There is obtained 54 parts of a volatile product which is distilled through a low temperature fractionation unit to give 29 parts of product boiling at −58 to −50° C. and 20 parts of product boiling at −50 to −30° C. The fraction boiling at −58 to −50° C. is shown by infrared analysis to contain on a molar basis 80% bromotrifluoromethane and 15% carbon tetrafluoride. The fraction boiling at −50 to −30° C. contains 30% bromotrifluoromethane. About 87% of the carbon disulfide is converted to bromotrifluoromethane and 12% to carbon tetrafluoride.

Example VIII

This example illustrates the use of iodine as a catalyst in the process.

A mixture of 19 parts of carbon disulfide, 20 parts of bromine, 40 parts of sulfur tetrafluoride, and 5 parts of iodine is heated with agitation at 200° C. for 1 hour, 300° C. for 1 hour, and 325° C. for 1 hour. The molar ratio of reactants, carbon disulfide/bromine/sulfur tetrafluoride, is about 2/1/3. There is obtained 48 parts of a volatile product which is distilled as described previously to yield 25 parts of product boiling at −58° C. to −47° C. and 15 parts boiling at −46° to −30° C. Infrared analysis of the fraction boiling at −58° to −47° C. shows that it contains (molar basis) 70–75% bromotrifluoromethane and 20% carbon tetrafluoride. The fraction boiling at −46° to −30° C. contains (molar basis) 5–10% bromotrifluoromethane. The yield of bromotrifluoromethane, based on carbon disulfide, is about 57%; of carbon tetrafluoride, about 15%.

There is obtained in this reaction about 30 parts of a dark-colored semi-solid by-product from which 14 parts of sulfur is isolated. The presence of iodine during the reaction results in more efficient utilization of the bromine since only a small quantity of sulfur bromide is formed.

Example IX

This example illustrates the use of arsenic trifluoride as a catalyst at a relatively low reaction temperature.

A mixture of 19 parts of carbon disulfide, 75 parts of bromine, 40 parts of sulfur tetrafluoride, and 6 parts of arsenic trifluoride is heated with agitation at 150° C. for 2 hours and 225° C. for 4 hours. The molar ratio of reactants, carbon disulfide/bromine/sulfur tetrafluoride, is about 8/15/12. There is obtained 52 parts of a volatile product which is distilled through a low temperature fractionation unit to yield the following materials: (a) 16 parts of product boiling at −50 to −47° C. which contains (molar basis) about 65–70% bromotrifluoromethane and 15–20% carbon tetrafluoride, and (b) 12 parts of product boiling at −43 to −31° C. which contains 10% bromotrifluoromethane. The yield of bromotrifluoromethane, based on carbon disulfide, is about 38%; of carbon tetrafluoride, 3%.

The process of the invention thus provides a simple and economical method of obtaining bromofluoromethanes.

I claim:

1. A process for producing bromofluoromethanes comprising reacting at a temperature of at least about 125° C. carbon disulfide, bromine and a binary fluoride of an element selected from the group consisting of sodium, potassium, calcium, copper, zinc, and sulfur, said fluoride having at most four fluorine atoms.

2. The process of claim 1 carried out in the presence of a catalyst.

3. The process of claim 1 carried out at a pressure of at least 5 atmospheres.

4. The process of claim 1 carried out at a temperature of between about 150 and 500° C.

5. The process of claim 1 wherein the molar ratio of fluoride to carbon disulfide lies between about 0.5 and 40 and the molar ratio of bromine to carbon disulfide lies between about 0.1 and 20.

6. A process for producing bromofluoromethanes comprising reacting at a temperature of at least about 125° C. carbon disulfide, bromine and potassium fluoride.

7. A process for producing promofluoromethanes comprising reacting at a temperature of at least about 125° C. carbon disulfide, bromine and sodium fluoride.

8. A process for producing bromofluoromethanes comprising reacting at a temperature of at least about 125° C. carbon disulfide, bromine and sulfur tetrafluoride.

9. A process for producing bromofluoromethanes comprising reacting at a temperature of at least about 125° C. carbon disulfide, bromine and copper fluoride.

10. A process for producing bromofluoromethanes comprising reacting at a temperature of at least about 125° C. carbon disulfide, bromine and sodium fluoride, the molar ratio of fluoride to carbon disulfide lying between about 0.5 and 40 and the molar ratio of bromine to carbon disulfide lying between about 0.1 and 20.

11. A process for producing bromofluoromethanes comprising reacting at a temperature of at least about 125° C. carbon disulfide, bromine and potassium fluoride, the molar ratio of fluoride to carbon disulfide lying between about 0.5 and 40 and the molar ratio of bromine to carbon disulfide lying between about 0.1 and 20.

12. A process for producing bromofluoromethanes comprising reacting at a temperature of at least about 125° C. carbon disulfide, bromine and copper fluoride, the molar ratio of fluoride to carbon disulfide lying between about 0.5 and 40 and the molar ratio of bromine to carbon disulfide lying between about 0.1 and 20.

13. A process for producing bromofluoromethanes comprising reacting at a temperature of at least about 125° C. carbon disulfide, bromine and sulfur tetrafluoride, the molar ratio of fluoride to carbon disulfide lying between about 0.5 and 40 and the molar ratio of bromine to carbon disulfide lying between about 0.1 and 20.

References Cited in the file of this patent

UNITED STATES PATENTS

| | | |
|---|---|---|
| 2,104,695 | Gleave | Jan. 4, 1938 |
| 2,673,884 | Thomas | Mar. 30, 1954 |
| 2,709,185 | Muetterties | May 24, 1955 |
| 2,709,186 | Farlow et al. | May 24, 1955 |
| 2,709,187 | Farlow et al. | May 24, 1955 |
| 2,709,188 | Farlow et al. | May 24, 1955 |

FOREIGN PATENTS

| | | |
|---|---|---|
| 463,970 | Great Britain | Apr. 8, 1937 |

UNITED STATES PATENT OFFICE
CERTIFICATION OF CORRECTION

Patent No. 2,972,637            February 21, 1961

Charles William Tullock

It is hereby certified that error appears in the above numbered patent requiring correction and that the said Letters Patent should read as corrected below.

Column 1, line 38, strike out "fluoride of an element of atomic number 11-30, inclusive, --; column 6, line 70, for "promofluoromethanes" read -- bromofluoromethanes --.

Signed and sealed this 25th day of July 1961.

(SEAL)
Attest:

ERNEST W. SWIDER
Attesting Officer

DAVID L. LADD
Commissioner of Patents